United States Patent [19]

Hasegawa

[11] Patent Number: 5,176,806
[45] Date of Patent: Jan. 5, 1993

[54] SOFT MAGNETIC ALLOY FILM

[75] Inventor: Naoya Hasegawa, Yunotani, Japan
[73] Assignee: Alps Electric Co., Ltd., Tokyo, Japan
[21] Appl. No.: 589,126
[22] Filed: Sep. 27, 1990

Related U.S. Application Data

[62] Division of Ser. No. 473,563, Feb. 1, 1990, Pat. No. 5,104,464.

[30] Foreign Application Priority Data

Aug. 3, 1989 [JP] Japan .................................. 1-55570

[51] Int. Cl.$^5$ .............................................. C23C 14/34
[52] U.S. Cl. ............................... 204/192.11; 148/108; 148/122; 148/518; 204/192.2
[58] Field of Search ..................... 204/192.2, 192.11; 148/108, 112, 113, 121, 122, 518

[56] References Cited

U.S. PATENT DOCUMENTS 4,904,543 2/1990 Sakakima et al. ................... 428/610
4,944,805 7/1990 Nakanishi ............................ 148/108

FOREIGN PATENT DOCUMENTS 60-26624 2/1985 Japan .
2147608A 5/1985 United Kingdom .

OTHER PUBLICATIONS

John L. Vossen et al, Thin Film Processes, Academic Press, New York, 1978, pp. 48-50.
R. V. Stuart, Vacuum Technology, Thin Films and Sputtering, Academic Press, New York, 1983, pp. 130-131.

Primary Examiner—John Niebling
Assistant Examiner—William T. Leader
Attorney, Agent, or Firm—Guy W. Shoup; Paul J. Winters

[57] ABSTRACT

A soft magnetic alloy film has a composition formula expressed by Fex Mz Cw. M is at least one metallic element selected from a group consisting of Ti, Zr, Hf, Nb, Ta, Mo or W, or a mixture of these metallic elements. The composition ratio of x, z and w satisfies the relation expressed by 50 atomic % $\leq x \leq$ 96 atomic %, 2 atomic % $\leq z \leq$ 30 atomic %, 0.5 atomic % $\leq w \leq$ 25 atomic %, and x+z+w=100. The metallic structure of the soft magnetic alloy film basically consists of crystal grains having an average grain size of 0.08 μm or below. The metallic structure contains the crystal phase of carbide of the element M.

19 Claims, 3 Drawing Sheets

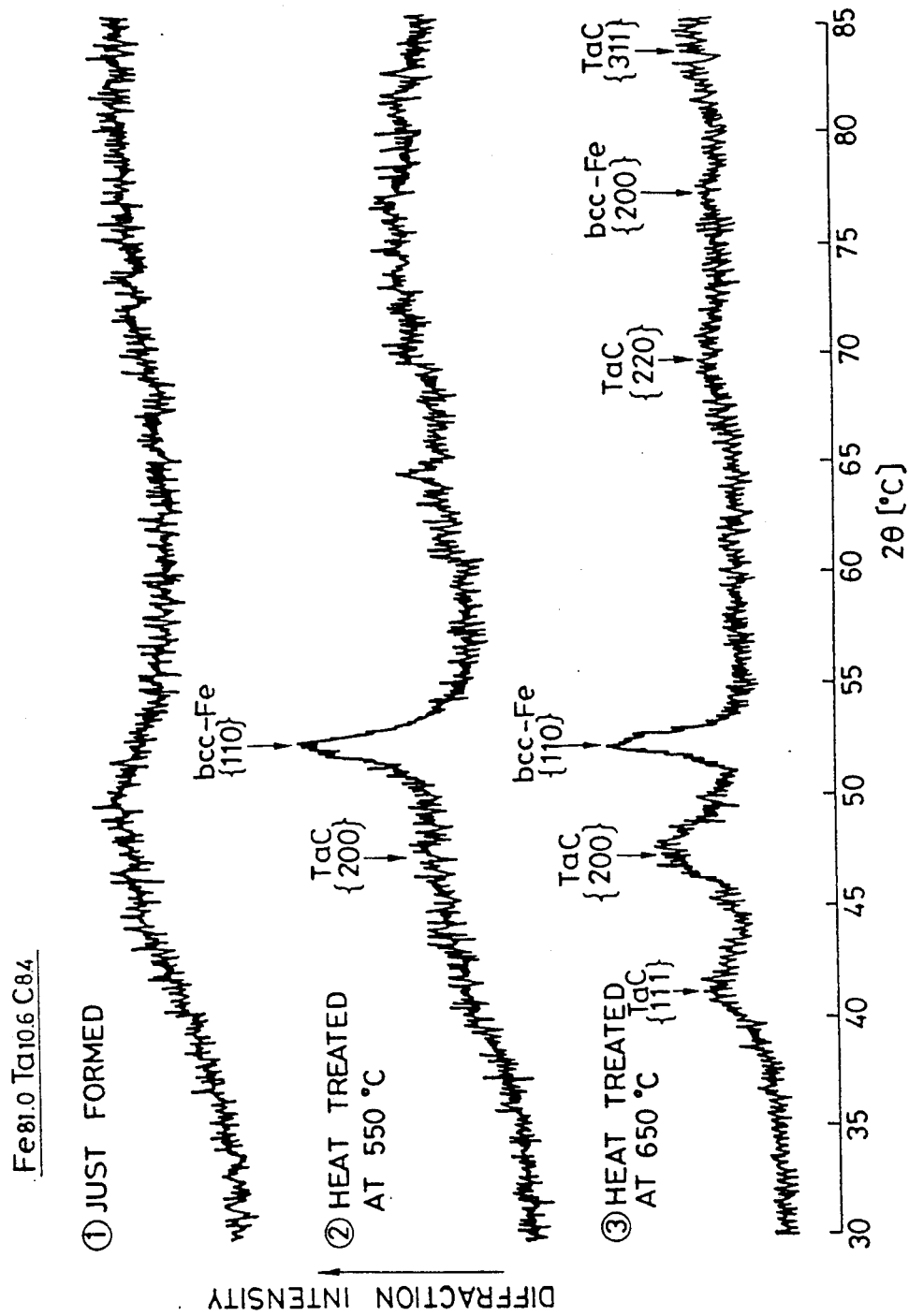

SOFT MAGNETIC ALLOY FILM

This application is a division of application Ser. No. 07/473,563, filed Feb. 1, 1990, now U.S. Pat. No. 5,104,464.

BACKGROUND OF THE INVENTION

1. Field of the Invention

The present invention relates to a soft magnetic alloy film for use in a magnetic head or the like.

2. Description of the Related Art

In the field of a magnetic recording, there is a demand for magnetic head materials which have a high saturation magnetic flux density (Bs) and which are therefore capable of coping with a recording medium, such as a magnetic tape, having a high coercive force and, hence, a high recording density.

Conventional soft magnetic materials (films) having a high saturation magnetic flux density include Fe-Si-Al alloy (sendust). In recent years, however, amorphous alloy films mainly composed of the ferromagnetic metallic element Co have been developed.

Further, alloy films (Fe-C and Fe-Si films), which are mainly composed of Fe and which consist of crystallite, have recently been proposed. Such alloy films have a high saturation magnetic flux density and excellent soft magnetic characteristics because the adverse effects of the crystal magnetic anisotropy of Fe (to the soft magnetic characteristics) are alleviated by the refining of the crystal grains.

Recently, the apparatuses with a magnetic head incorporated therein have been reduced in size as well as in weight. Further, such apparatuses are often subjected to vibrations caused by transportation and use under unfavorable conditions. Hence, there is a demand for magnetic heads which have excellent magnetic characteristics, which are abrasion resistant to the magnetic tape, which withstand temperature or corrosive atmosphere, i.e., unfavorable environments, and which are highly resistant to vibrations. These require that a glass bonding process be employed to form a gap or incorporate the magnetic head into a casing. This in turn requires that the magnetic head be made of a material which can withstand the high temperatures which are reached during the glass bonding process.

However, the conventional soft magnetic alloy film sendust has a saturation magnetic flux density of about 10000 G (gauss), which is unsatisfactory to cope with the demands of a magnetic tape having a high recording density. The Co type amorphous alloy film have a high saturation magnetic flux density of 13000 G or above. However, in order to provide an amorphous alloy having a high saturation magnetic flux density, an amount of amorphous alloy forming element employed, such as Ti, Zr, Hf, Nb, Ta, Mo and W, must be decreased. Decrease in the amount of amorphous alloy forming element causes the stability of the amorphous structure to be reduced, thereby causing the resultant alloy to be unable to withstand the temperature required for glass bonding process (about 500° C. or above).

Furthermore, the above-described alloy films (Fe-C, Fe-Si and so on), composed mainly of Fe and consisting of fine crystals, generate growth of the crystal grains at high temperatures and therefore deterioration occurs in their soft magnetic characteristics (at 400° C. at maximum in the case of Fe-C alloy). This makes these alloy films unsuitable for glass bonding.

SUMMARY OF THE INVENTION

In view of the aforementioned problems of the prior art, an object of the present invention is to provide a soft magnetic alloy film which has a small coercive force and a high permeability, which is thermally stable, and which possesses a high saturation magnetic flux density.

The invention according to the embodiment is a soft magnetic alloy film whose composition formula is expressed by $Fe_x M_z C_w$. M is at least one metallic element selected from a group consisting of Ti, Zr, Hf, Nb, Ta, Mo or W, or a mixture of these metallic elements. The composition ratio of x, z and w satisfies the relation expressed by the following equations.

$$50 \text{ atomic \%} \leq x \leq 96 \text{ atomic \%}$$
$$2 \text{ atomic \%} \leq z \leq 30 \text{ atomic \%}$$
$$0.5 \text{ atomic \%} \leq w \leq 25 \text{ atomic \%}$$
$$x + z + w = 100.$$

The metallic structure of the soft magnetic alloy film basically consists of crystal grains having an average grain size of 0.08 μm or below, and contains the crystal phase of carbide of the element M.

In another aspect of this embodiment, the metallic structure of the alloy film basically consists of crystal grains having an average grain size of 0.08 μm or below and an amorphous structure.

The invention according to another embodiment is a soft magnetic alloy film whose composition formula is expressed by $Fe_x T_y M_z C_w$. T is at least one metallic element selected from a group consisting of Co and Ni, or a mixture of these metallic elements. M is at least one metallic element selected from a group consisting of Ti, Zr, Hf, Nb, Ta, Mo or W, or a mixture of these metallic elements. The composition ratio of x, y, z and w satisfies the relation expressed by the following equations.

$$50 \text{ atomic \%} \leq x \leq 96 \text{ atomic \%}$$
$$0.1 \text{ atomic \%} \leq y \leq 10 \text{ atomic \%}$$
$$2 \text{ atomic \%} \leq z \leq 30 \text{ atomic \%}$$
$$0.5 \text{ atomic \%} \leq w \leq 25 \text{ atomic \%}$$
$$x + y + z + w = 100.$$

The metallic structure of the soft magnetic alloy film basically consists of crystal grains having an average grain size of 0.08 μm or below and contains the crystal phase of carbide of the element M.

In another aspect of this embodiment, the metallic structure of the alloy film basically consists of crystal grains having an average grain size of 0.08 μm or below and an amorphous structure.

BRIEF DESCRIPTION OF THE DRAWINGS

FIG. 3 is a graph of patterns of X-ray diffraction which is conducted to identify the metallic structure of the film according to the present invention.

DESCRIPTION OF THE PREFERRED EMBODIMENTS

Figure 1:
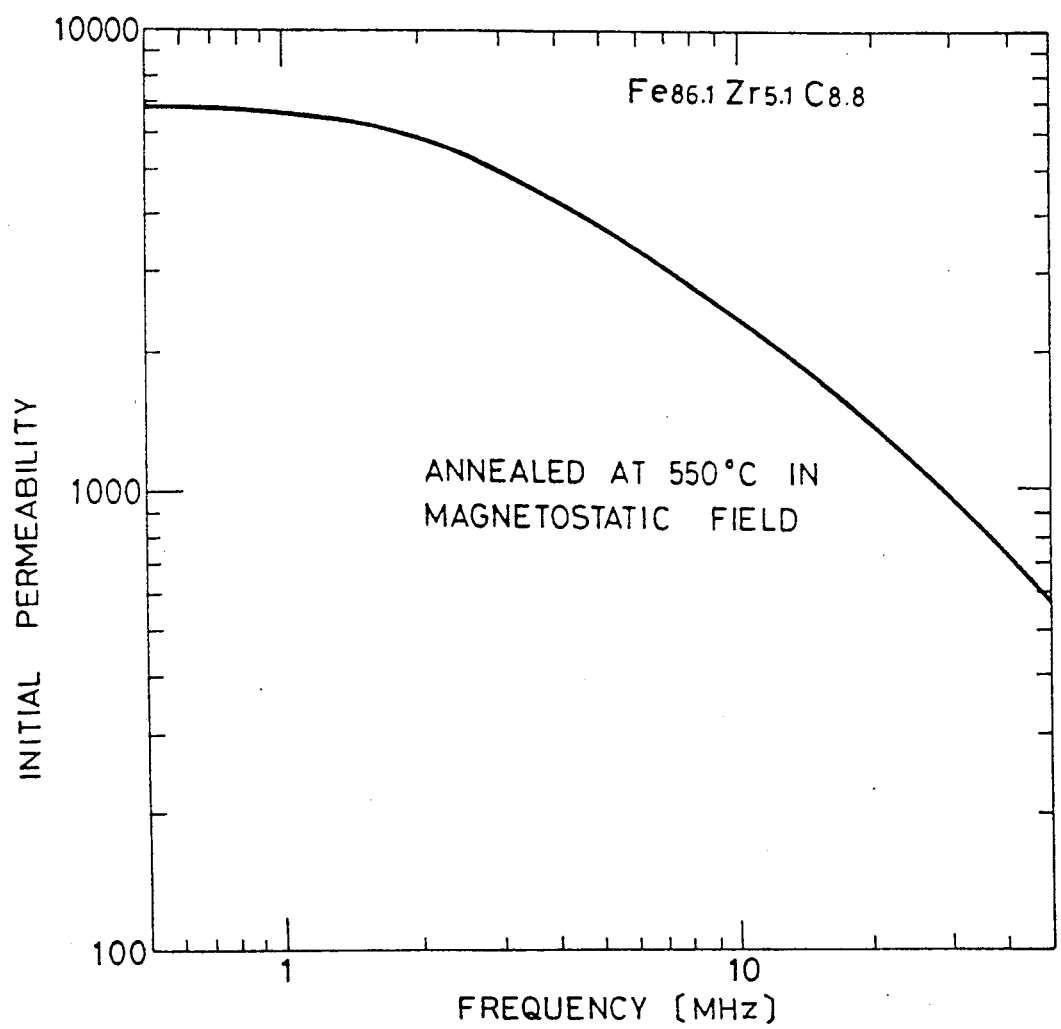
FIG. 1 is a graph, showing the relation between the permeability and the frequency in a first embodiment of the present invention.

The present invention will be described below in detail.

The alloy film may be formed by a thin film forming apparatus which employs sputtering or deposition technique. Suitable sputtering devices include the RF double-pole sputtering device, the DC sputtering device, the magnetron sputtering device, the three-pole sputtering device, the ion beam sputtering device, and the double-target type sputtering device. C may be added in the film by providing a composite target and then by sputtering this composite target. The composite target is provided by disposing a pellet made of graphite on the target. Alternatively, C may be added in the film by the reactive sputtering method in which a target (Fe-T-M series) containing no C is sputtered in the atmosphere which is a gas mixture of an inactive gas, such as Ar, and a hydrocarbon gas, such as methane ($CH_4$). The reactive sputtering method is particularly preferable because the concentration of C contained in the film is readily controlled to achieve a film containing a desired concentration of C.

The film thus-obtained contains amorphous phase to a considerable degree, and is therefore unstable. The film is therefore subjected to heat treatment at a temperature ranging from 400° C. to 700° C. so as to allow the crystallite to be precipitated. When this heat treatment is conducted in the presence of magnetostatic or rotating magnetic field, the resultant alloy film possesses excellent soft magnetic characteristics. The heat treatment may be performed as the glass bonding process which is one of the manufacturing processes of a magnetic head.

It is not necessary for the crystallite precipitation process to be performed completely: it is enough that some crystallite (preferably, 50% or above) has been precipitated from the alloy film. The remaining amorphous components do not degrade the characteristics of the alloy film.

The alloy film according to the present invention has the aforementioned composition for the following reasons.

Fe is the main constituent. Fe is the element which makes the resultant alloy film magnetic. In order to provide an alloy film having a saturation magnetic flux density which is equal to or higher than that of ferrites (Bs≈5000 G or above), x should be 50 atomic % or above. Also, x should be 96 atomic % or below in order to achieve excellent soft magnetic characteristics.

The element T (selected from a group consisting of Co and Ni) is added for the purpose of adjusting the magnetostriction of the alloy film. In the case of Fe-M-C film, when the heat treatment is conducted at a low temperature, the resultant film undergoes a positive magnetostriction, whereas the film undergoes a negative magnetostriction when it is subjected to the heat treatment at a high temperature. In a case where the alloy film has to be subjected to the heat treatment at a high temperature, (glass bonding has to be performed at a high temperature), the magnetostriction of the resultant alloy film may be substantially cancelled by adding an adequate amount of Ni or Co, which is effective in generating the positive magnetostriction. In a case where the heat treatment is conducted at an adequate temperature, addition of the element T is not necessary. The rate of T added should be 10 atomic % or below so that the resultant alloy film does not undergo a positive magnetostriction of about $+10^{-5}$ or above. The element M is added so as to improve the soft magnetic characteristics. Also, the element M combines with C to form the crystallite of carbide. The excellent soft magnetic characteristics may be maintained when z is 2 atomic % or above. Also, z should be 30 atomic % or below so as to prevent the saturation magnetic flux density of the resultant alloy film from being reduced excessively.

C is added so as to improve the soft magnetic characteristics as well as the heat resistant characteristics. C combines with the element M to form the crystallite of carbide. The excellent soft magnetic characteristics and thermal stability may be maintained when w is 0.5 atomic % or above. Also, w should be 25 atomic % or below so as to prevent the saturation magnetic flux density of the resultant alloy film from being reduced excessively.

The crystallite of the carbide of the element M acts as the pinning site of the magnetic domain wall to improve the high-frequency characteristics of the permeability. Also, when dispersed in the film uniformly, the crystallite of the carbide of the element M prevents deterioration of the soft magnetic characteristics caused by the growth of the crystallite of Fe due to the heat treatment. In other words, growth of the crystal grains of Fe increases the adverse effect of the crystal magnetic anisotropy, thus degrading the soft magnetic characteristics. However, the crystallite of the carbide of the element M serves as the barrier to the growth of the crystal grains of Fe, and therefore prevents deterioration of the soft magnetic characteristics.

The metallic structure of the alloy film basically consists of fine crystals having a diameter of 0.08 μm or below. The alloy film is excellent in thermal stability when compared with the amorphous film. Moreover, the amount of element to be added can be reduced, and the saturation magnetic flux density can be increased.

Since the soft magnetic alloy film according to the present invention is mainly composed of Fe and the amount of constituents which reduce the saturation magnetic flux density is limited, a saturation magnetic flux density of 17600 G can be achieved at a maximum. Furthermore, the elements M and C are contained in the alloy, and the metallic structure of the alloy consists of the fine crystal grains. In consequence, the adverse effects of the crystal magnetic anisotropy to the soft magnetic characteristics can be alleviated to achieve excellent soft magnetic characteristics. Furthermore, since the carbide of the element M restricts the growth of the crystal grains of Fe, the crystal grains of Fe do not grow further when the alloy film is heated at 600° C. or above during the glass bonding process.

(1) Formation of Film

Alloy films having the compositions shown in Table 1 were formed using a RF double-pole sputtering device.

Composite targets constructed by disposing pellets of one or more elements selected from the group consisting of Zr, Ta, Hf, and Co on an Fe target were used. Sputtering was conducted in the atmosphere which was a mixture gas of Ar gas and $CH_4$ gas. The resultant films had a thickness of 5 to 6 μm.

(2) Heat Treatment

The thus-formed alloy film was held in the magnetostatic field at 550° C. for 20 minutes, or the alloy film was held at 550° C. for 20 minutes in the absence of magnetic field. Alternatively, the alloy film was held at 650° C. for 20 minutes in the absence of magnetic field.

(3) Measurement

After the heat treatment, the saturation magnetic flux density (Bs), the permeability ($\mu$), the coercive force (Hc), and the magnetostriction of the alloy films manufactured in the above-described manner and those of the sendust alloy film (comparative example) were measured. The results of the measurement are shown in Table 1.

TABLE 1

| | Sample | Film composition | Saturation magnetic flux density Bs(G) | Permeability $\mu$(5MHz) | | | Coercive force Hc [Oe] | Saturation magnetostriction constant $\lambda$S | |
| | | | | Heat treated in the magnetostatic field at 550° C. | Heat treated in the absence of magnetic field at 550° C. | Heat treated in the absence of magnetic field at 650° C. | Heat treated in the magnetostatic field at 550° C. | Heat treated in the absence of magnetic field at 550° C. | Heat treated in the absence of magnetic field at 650° C. |
|---|---|---|---|---|---|---|---|---|---|
| Present Invention | A | $Fe_{86.1}Zr_{5.1}C_{8.8}$ | 17300 | 3620 | 420 | 630 | 0.35 | $+1.2 \times 10^{-6}$ | $-1.8 \times 10^{-6}$ |
| | B | $Fe_{82.9}Hf_{8.4}C_{8.7}$ | 15600 | 2540 | 1790 | 1100 | 0.26 | $+2.8 \times 10^{-6}$ | $-0.3 \times 10^{-6}$ |
| | C | $Fe_{81.0}Ta_{10.6}C_{8.4}$ | 14900 | 3220 | 1600 | 1180 | 0.51 | $+2.1 \times 10^{-6}$ | $+0.4 \times 10^{-6}$ |
| | D | $Fe_{84.9}Co_{1.4}Zr_{5.0}C_{8.7}$ | 17600 | 2500 | 410 | 700 | 0.28 | $+3.0 \times 10^{-6}$ | $+0.2 \times 10^{-6}$ |
| Comparative Example | E | $Fe_{73.7}Si_{16.6}Al_{9.7}$ (Sendust film) | 10000 | — | 1500 | 1000 | 0.40 | $+1.0 \times 10^{-6}$ | $+1.0 \times 10^{-6}$ |

Sample A shown in Table 1 exhibits a saturation magnetic flux density (17300 G) which is far higher than that of the sendust film. The conventional amorphous alloy film generally exhibits a saturation magnetic flux density of about 13000 G. An amorphous alloy exhibiting such a high saturation magnetic flux density as that of sample A may be crystallized when subjected to a similar heat treatment (at 550° C. for 2 hours), and therefore exhibit a permeability of 100 or below. In other words, after the glass bonding has been conducted on the amorphous alloy film, the magnetic characteristics of the film deteriorates, making it unsuitable as a magnetic head. These prove that sample A according to the present invention is an excellent alloy film which maintains a high permeability after it has been subjected to heat treatment at a high temperature.

Furthermore, sample A possessed excellent soft magnetic characteristics when subjected to the heat treatment at 550° C. in the magnetostatic field: it exhibited a permeability (5 MHz) of 3620 in the direction of the axis of hard magnetization, and a coercive force of 0.35 Oe. Also, samples B and C respectively have a saturation magnetic flux density of 15600 G and 14900 G, and exhibit a permeability which is higher than that of sample E which is a sendust film. The films of samples B and C maintain a high permeability after they have been subjected to the heat treatment in the absence of magnetic field. This cannot be realized by the conventional amorphous film having a high saturation magnetic flux density. More specifically, the amorphous film readily becomes magnetically anisotropic due to the directional alignment of its atoms. In consequence, when the amorphous film is subjected to heat treatment in the absence of magnetic field at a temperature which is Curie point or below, the soft magnetic characteristics of the film greatly deteriorates as the result of fixing of the magnetic domains. In consequence, the use of the alloy according to the present invention enables the glass bonding process to be conducted in the absence of magnetic field, thereby simplifying the manufacturing process of the magnetic head.

Furthermore, samples B and C which have been subjected to heat treatment at 550° C. respectively exhibit a positive magnetostriction constant of $+2.8 \times 10^{-6}$ and $+2.1 \times 10^{-6}$. When the temperature of the heat treatment is raised to 650° C., however, the samples B and C respectively exhibit a magnetostriction constant of $-0.3 \times 10^{-7}$ and $+0.4 \times 10^{-7}$, which are substantially zero. More specifically, although the film undergoes the inverse magnetostriction, caused by the processing strain or the thermal strain generated during the glass bonding process, in the manufacturing process of the magnetic head, degradation of the soft magnetic characteristics of the film due to the inverse magnetostriction is eliminated when the magnetostriction of the film is small. Furthermore, whereas the conventional amorphous iron alloy (manufactured by the liquid quenching method) has a large magnetostriction constant of about $+2 \times 10^{-5}$, the samples A, B, C and D have a low magnetostriction.

In Table 1, sample D is a film manufactured by adding Co to the alloy which forms sample A. In this way, the magnetostriction of the film is adjusted. The film which has been heat treated at 650° C. therefore undergoes a low magnetostriction. Co is added so as to increase the saturation magnetic flux density as well as to adjust the magnetostriction. The film of sample D therefore exhibits a high saturation magnetic flux density of 17600 G.

Figure 2:
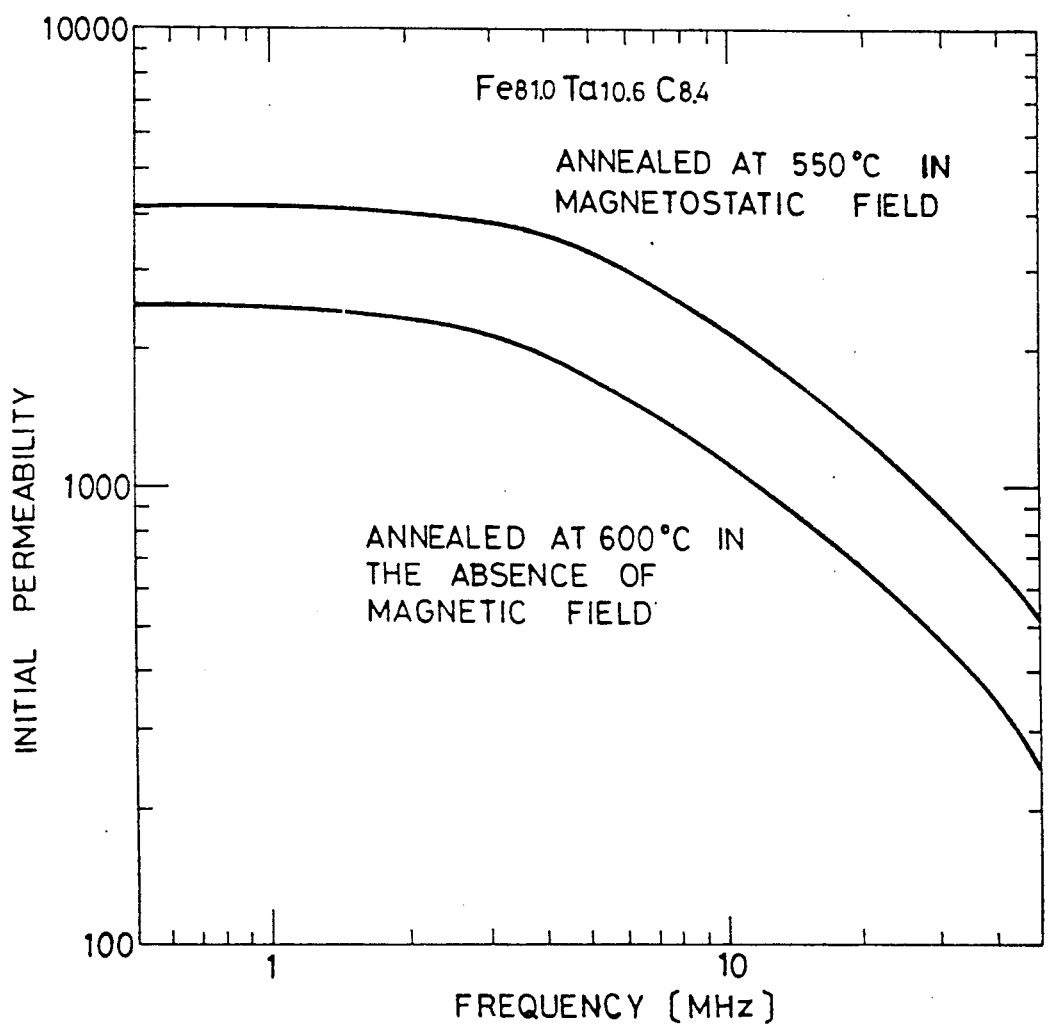
FIG. 2 is a graph, showing the relation between the permeability and the frequency in a second embodiment of the present invention.

FIGS. 1 and 2 are graphs, showing the relation between the permeability of the films of samples A and C and the frequency applied thereto. Each of the samples exhibits a high permeability, e.g., about 1100 to 2300 in the vicinity of a high frequency region of about 10 MHz. Although a higher permeability can be obtained by heat treating the film in the magnetostatic field, as shown in FIG. 1, a high permeability can also be maintained while the temperature of the heat treatment can be raised to 600° C. when the film is heat treated in the absence of magnetic field, as shown in FIG. 2.

X-ray diffraction was conducted on the alloy films so as to identify the metallic structure thereof. FIG. 3 shows the X-ray diffraction pattern (1) of the film of sample C which is not heat-treated, the diffraction pattern (2) of the film which has been heat treated at 550° C. for 20 minutes, and the diffraction pattern (3) of the film which has been subjected to the heat treatment at 650° C. for 20 minutes.

The pattern 1 in FIG. 3 exhibits a halo pattern which is close to that of the amorphous phase. The alloy in this state exhibits neither the sufficient saturation magnetic flux density nor sufficient soft magnetic characteristics. In the pattern (2) in FIG. 3, {110} peak of Fe having a body-centered cubic (bcc) structure and small TaC (carbide of Ta) peak appear, although the halo pattern of the amorphous phase still remains slightly. This means that this structure consists of both amorphous phase and crystal phase. Each of the peaks of the crystal phase exhibited in the pattern (2) is broad, and this means that the crystal grains are fine. The diameter of the crystal grains of Fe having the bcc structure, obtained from the half band width of the peaks, is about 60 to 70 Å. This film possesses a structure shown by the pattern (3) which consists of only the crystallite when subjected to the heat treatment at a high temperature. Either of the films shown by the patterns (2) and (3) exhibits a high saturation magnetic flux density and excellent soft magnetic characteristics.

As will be understood from the foregoing description, a soft magnetic alloy film according to the present invention is mainly composed of Fe, and consists of fine crystal grains having an average diameter of 0.08 μm or below. Since the amount of constituent added, which reduces the saturation magnetic flux density, is limited, the resultant alloy film exhibits a saturation magnetic flux density which is higher than that of the conventional sendust alloy film, e.g., a saturation magnetic flux density of 17600 G at a maximum. Furthermore, unlike the conventional amorphous alloy film, the soft magnetic alloy film according to the present invention possesses high saturation magnetic flux density and permeability even when it is subjected to the heat treatment in the absence of magnetic field.

Furthermore, the alloy film according to the present invention contains the element M (Ti, Zr, Hf, Nb, Ta, Mo, W) and C which are effective in improving the soft magnetic characteristics, and has a metallic structure consisting of fine crystal grains. In consequence, the adverse effects of the crystal magnetic anisotropy to the soft magnetic characteristics can be alleviated, and excellent soft magnetic characteristics can therefore be obtained. Furthermore, since the metallic structure of the film consists of fine crystal grains and the element M and C are combined with each other to form a carbide, the crystal grains do not grow further even when the alloy film is heated at 600° C. or above during the glass bonding process, and the film therefore maintains the above-described characteristics, resulting in the alloy film which is suitable as the material of a magnetic head which has a high performance required to achieve a high density recording.

Furthermore, the element T (Co, Ni) is added to the above-described composition so as to adjust the magnetostriction. In consequence, the characteristics of the resultant alloy film are further improved.

What is claimed is;

1. A method of forming a soft magnetic alloy film comprising a film composition with a general formula of Fex Mz Cw, wherein M is one or more metallic elements selected from a group consisting of Zr, Hf, or Ta, in that said composition has a ratio of x, z and w which satisfies a relation expressed by the following equations:

$$50 \text{ atomic \%} \leq x \leq 96 \text{ atomic \%}$$
$$2 \text{ atomic \%} \leq z \leq 30 \text{ atomic \%}$$
$$0.5 \text{ atomic \%} \leq w \leq 25 \text{ atomic \%}$$
$$x + z + w = 100.$$

said soft magnetic alloy film having a metallic structure basically consisting of crystal grains having an average grain size of 0.08 μm or below and said metallic structure containing a crystal phase of carbide of said element M; said method comprising the steps of:

depositing said film using a composite target comprising an Fe target and one or more pellets of M disposed thereon, said depositing being performed in the presence of a carbon source and using sputtering deposition techniques; and heat treating said film at least 400° C. for 20 minutes to precipitate a crystallite comprising M-C.

2. A method according to claim 1, wherein said step of depositing is performed using RF double-pole sputtering, DC sputtering, magnetron sputtering, 3-pole sputtering, ion beam sputtering or double-target sputtering techniques.

3. A method according to claim 2 wherein said step of depositing is performed using RF double-pole sputtering.

4. A method according to claim 2, wherein said carbon source is a pellet of graphite disposed on said Fe target.

5. A method according to claim 2, wherein said carbon source is a hydrocarbon gas, and said sputtering is performed in an atmosphere comprising an inert gas and said hydrocarbon gas.

6. A method according to claim 5, wherein said inert gas is argon and said hydrocarbon gas is methane.

7. A method according to claim 2, wherein said step of heat treating further comprises exposing said film to a magnetostatic field.

8. A method according to claim 2, wherein said step of heat treating further comprises exposing said film to a rotating magnetic field.

9. A method according to claim 2, wherein said film is heat treated at 650° C. for 20 minutes.

10. A method according to claim 2, wherein said step of heat treating precipitates at least 50% of said crystallite from said film.

11. A method of forming a soft magnetic alloy film comprising a film composition with a general formula of FexTyMzCw, wherein T is Co, and M is one or more metallic elements selected from a group consisting of Zr, Hf, or Ta, in that said composition has a ratio of x, y, z and w which satisfies a relation expressed by the following equations:

$$50 \text{ atomic \%} \leq x \leq 96 \text{ atomic \%}$$
$$0.1 \text{ atomic \%} \leq y \leq 10 \text{ atomic \%}$$
$$2 \text{ atomic \%} \leq z \leq 30 \text{ atomic \%}$$
$$0.5 \text{ atomic \%} \leq w \leq 25 \text{ atomic \%}$$
$$x + y + z + w = 100.$$

said soft magnetic alloy film having a metallic structure basically consisting of crystal grains having an average grain size of 0.08 μm or below and said metallic structure containing a crystal phase of carbide of said element M; said method comprising the steps of:

depositing said film using a composite target comprising an Fe target, one or more pellets of M, and a pellet of T, said pellets being disposed on said Fe target, said depositing being performed in the presence of a carbon source and using sputtering deposition techniques; and heat treating said film at least 400° C. for 20 minutes to precipitate a crystalline comprising M-C.

12. A method according to claim 11, wherein said step of depositing is performed using RF double-pole sputtering.

13. A method according to claim 11, wherein said carbon source is a pellet of graphite disposed on said Fe target.

14. A method according to claim 11, wherein said carbon source is a hydrocarbon gas, and said sputtering is performed in an atmosphere comprising an inert gas and said hydrocarbon gas.

15. A method according to claim 14, wherein said inert gas is argon and said hydrocarbon gas is methane.

16. A method according to claim 11, wherein said step of heat treating further comprises exposing said film to a magnetostatic field.

17. A method according to claim 11, wherein said step of heat treating further comprises exposing said film to a rotating magnetic field.

18. A method according to claim 11, wherein said film is heat treated at 650° C. for 20 minutes.

19. A method according to claim 11, wherein said step of heat treating precipitates at least 50% of said crystallite from said film.

* * * * *